Feb. 22, 1966  T. A. STANSELL, JR., ETAL  3,237,192
NAVIGATION RECEIVER
Filed Sept. 24, 1962  3 Sheets-Sheet 2

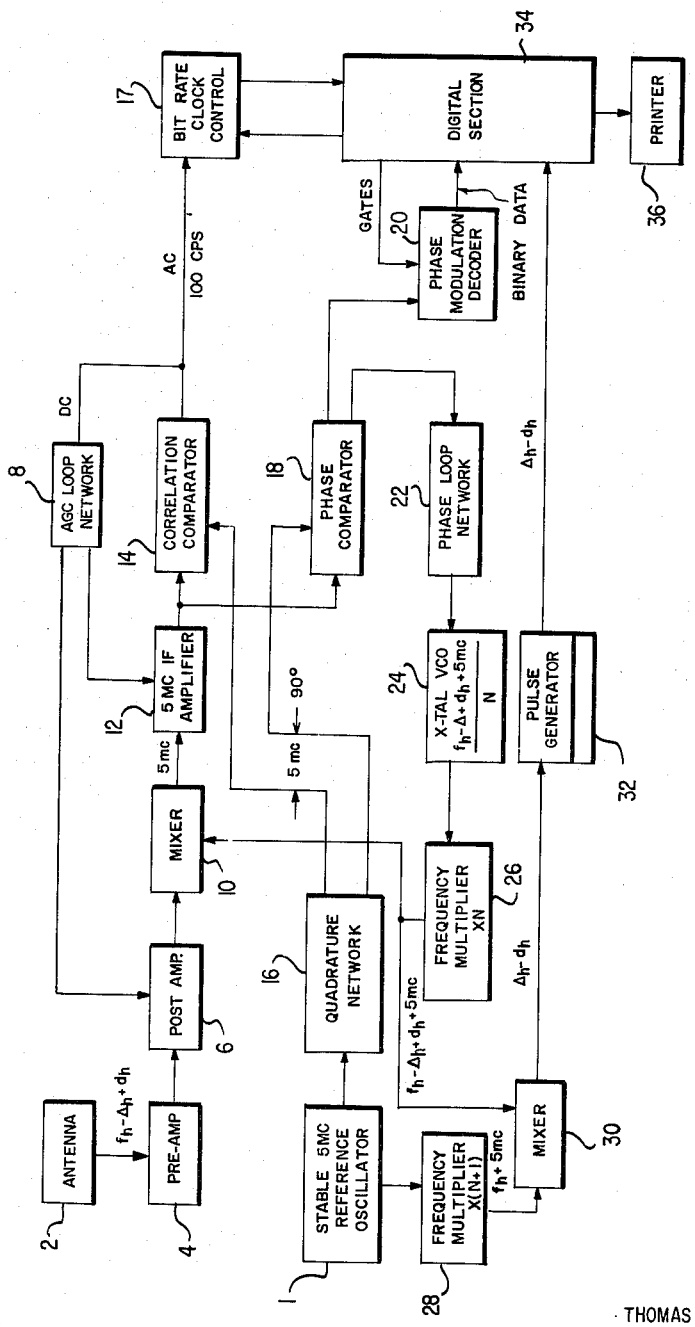
FIG. I
INVENTORS,
THOMAS A. STANSELL, JR.
JOHN WALTON
BY
*Stansell & Stansell*
ATTORNEYS.

INVENTORS.
THOMAS A. STANSELL, JR.
JOHN WALTON
BY
Stowell & Stowell
ATTORNEYS.

INVENTORS.
THOMAS A. STANSELL, JR.
JOHN WALTON
BY
Stansell & Stansell
ATTORNEYS.

United States Patent Office 3,237,192
Patented Feb. 22, 1966

3,237,192
NAVIGATION RECEIVER
Thomas A. Stansell, Jr., and John Walton, Howard County, Md., assignors to Research Corporation, New York, N.Y., a corporation of New York
Filed Sept. 24, 1962, Ser. No. 225,552
3 Claims. (Cl. 343—100)

This invention relates in general to Doppler navigation systems and, more particularly, to a Doppler navigation receiver.

William H. Guier in his U.S. patent application entitled "Method of Naviagtion", Serial No. 224,580 filed September 18, 1962, now Patent No. 3,191,176 issued June 22, 1965, describes a navigation system utilizing orbiting satellites. This system is based upon the principle that if the geodetic coordinates and altitude of the satellite are known to an observer, he can obtain his position by measuring the Doppler variations in the continuous wave signal being transmitted from the satellite. The orbiting satellites carry information of their own geodetic coordinates and altitude in their memories, and periodically transmit this informatiton by phase modulating a continuous wave signal.

The continuous wave signal will undergo the normal Doppler effect. That is, the frequency of the transmitted wave will increase when the satellite is approaching the observer, and the frequency will decrease when the satellite is receding from the observer. The receiver will then separate the Doppler frequency component from the received signal and render it suitable for counting in its associated digital section.

A major source of error in such a satellite Doppler tracking system is ionospheric refraction. For purposes of studying its effect upon the Doppler shift, the ionosphere can be replaced by an equivalent index of refraction. Since the Doppler shift of a signal emanating from a satellite is basically the time rate of change of its electromagnetic path length, it is altered from what it would be in the absence of the ionosphere.

The navigational error produced by ionospheric refraction can be understood quantitatively by noting that the maximum slope of the Doppler curve is a rough measure of the slant range, and that refraction has a direct effect on this slope. Since the effect of refraction is to decrease the slope, the refraction error will be such as to place the observer further from his actual location, as measured from the satellite, than would be true if the ionosphere had no effect upon the transmitted signals. For example, it has been found that for a ground range of 500 nautical miles and a transmitter frequency of 200 megacycles per second, the navigational error is approximately two nautical miles. Furthermore, the best attainable fit of the refracted Doppler curve by an unrefracted Doppler curve is about two cycles per second R.M.S., as opposed to a fit of about 0.2 cycle per second R.M.S. when the refraction contribution was not included.

Studies on the effects of refraction indicate that the refraction contribution cannot be ignored for transmitter frequencies up to about 500 megacycles per second. Furthermore, the degree to which the electron distribution in the ionosphere can be predicted, to permit a previous correction for refraction, indicates that such predictions are not sufficiently reliable to reduce the refraction-created errors dependably below one-half mile. Since it is not advisable to use transmitter frequencies greater than about 500 megacycles per second for a satellite navigation system, the present system was devised to eliminate the effects of ionospheric refraction by the use of two transmitter frequencies from the satellite, and to thereby take advantage of the dispersive effect of the ionosphere.

One object of the present invention, therefore, resides in the provision of a navigation receiver which will separate the position information from the received signal and render it suitable for decoding in associated equipment.

Another object of the invention is to provide a navigation receiver for tracking the received signal and for separating the Doppler frequency component from the received continuous wave signal.

A further object of the invention is to provide a navigation receiver for cancelling the refractive effect of the ionosphere upon the received Doppler frequency.

A still further object of the invention is to provide a simplified and reliable navigation receiver for the reception of signals from an orbiting satellite.

Other objects and many of the attendant advantages of this invention will be readily appreciated as the same becomes better understood by reference to the following detailed description when considered in connection with the accompanying drawings, wherein:

FIG. 1 is a block diagram of an embodiment of the invention in the form of a single frequency navigation receiver;

Figure 6:
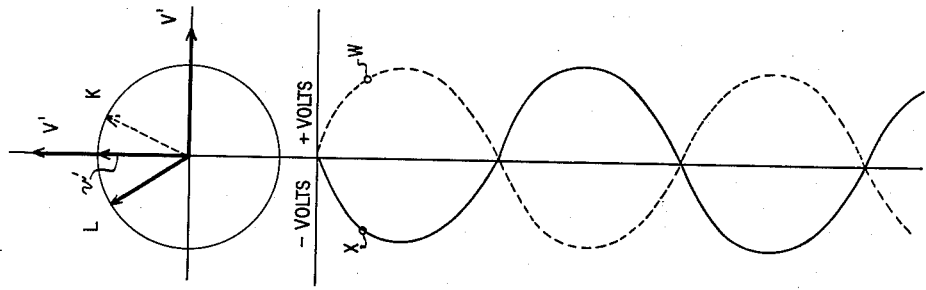
FIG. 6 is a diagram showing the operation of the phase comparator as utilized in the dual frequency navigation receiver.

Briefly, the invention consists of a phase-locked receiver that is locked to the signal received from a satellite, to allow the receiver to receive the signal within a bandwidth of only a few cycles per second, in spite of the tens of kilocycles swing in frequency during a pass. The signal from the receiver is then mixed with a signal from a local oscillator, and the difference frequency is filtered out and sent to a counter. This frequency count is proportional to the altitude of the satellite. Simultaneously, a phase modulation decoder separates the data bits, which contain the position information of the satellite, from the received signal. These data bits are compiled and then printed by an associated printer.

Additionally, when a higher degree of accuracy is needed, a second relatively lower frequency must be utilized which is also generated within the satellite and which is harmonically related to the first frequency. This second frequency is mixed with the appropriate portion of the first frequency within the receiver and automatically cancels out the ionospheric refraction effect of the atmosphere.

Referring to FIG. 1, there can be seen a phase locked receiver, including a 5 megacycle oscillator 1, suitable for generating the local reference beat frequency. This oscillator must be stable to the degree that it varies no more than one part in $10^9$ over a fifteen minute period. This degree of stability is not hard to attain and a carefully chosen crystal in a Dewar flask is entirely adequate. A suitable oscillator is that designated as Model No. 1113–A, manufactured by the General Radio Company.

An antenna 2 receives the continuous wave signal transmitted from the satellite. However, this continuous wave signal has been altered by the Doppler effect. Therefore, the observer may obtain the Doppler frequency by beating the received signal from the satellite with a signal from the local oscillator 1, deriving the difference frequency, and counting the cycles of the beat note. One complication could arise if the frequency from the local oscillator and the transmitted frequency were the same. The sign of the Doppler frequency would then shift from plus, when the satellite was approaching the observer, to minus, when the satellite was receding from the observer. However, the measurements can be unambiguously interpreted by offsetting the two frequencies by a value of 80 cycles in each megacycle. This offset exceeds the maximum Doppler shift, so that the beat note will never pass through a zero beat.

The frequency ($f_h$) received by the antenna 2 is relatively high and may be approximately 400 mc. As previously mentioned, it is necessary that the transmitted signal and the local beat frequency be offset sufficiently so that the beat frequency never passes through a zero beat. However, it is more convenient to speak of the transmitted continuous wave signal and the locally generated beat frequency as the same, but add a separate frequency component $\Delta_h$ and call it the offset frequency. Additionally, a part of the received frequency is attributable to the Doppler change $d_h$ in the transmitted frequency. Therefore, the frequency received by the antenna 2 is a complex frequency consisting of the transmitted frequency, minus the offset frequency, and plus the Doppler frequency attributed to the change in transmitted frequency.

As shown in FIG. 1, the complex frequency received by the antenna 2 is amplified in both a preamplifier 4 and a post amplifier 6. The post amplifier 6 has two input signals, one of which is the output from the preamplifier 4, and the other a control voltage from an automatic gain control loop network 8. It is necessary to control the gain of the amplifier 6, so that its later application to the following circuits will keep the signals within the design limits of each particular circuit.

The output of the amplifier 6 is the complex frequency and it is applied to a mixer 10. A second input to the mixer 10 is exactly 5 megacycles higher than the first-mentioned input, and is obtained by a method to be hereinafter described. The mixer extracts an intermediate difference frequency between the two applied frequencies and applies it to a 5 megacycle intermediate frequency amplifier 12. This amplifier 12 has a narrow bandwidth of approximately 3000 cycles per second.

A correlation comparator 14 has two input signals, one of which is a slightly changing 5 megacycle signal from the I.F. amplifier 12, and the other is a stable 5 megacycle reference signal from the precision oscillator 1, as applied by a quadrature network 16. The output from the correlation comparator 14 is a square wave of 100 cycles per second, which equals the modulation rate of the 5 megacycle signal from the satellite. This 100 c.p.s. modulation rate controls the decoding and gating of the positional information into a digital section, which is discussed hereinafter, under the direction of a bit rate clock control circuit 17. The bit rate clock control 17 synchronizes itself with the digital section. The means for obtaining this control voltage is illustrated in FIG. 2.

Figure 2:
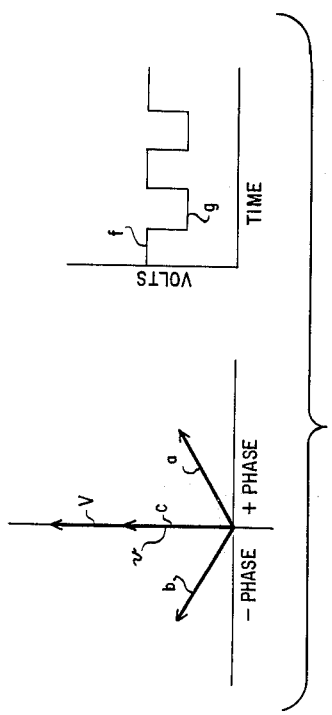
FIG. 2 is a diagram illustrating the operation of the correlation comparator as used in the instant invention.

Referring to FIG. 2, there can be seen an A.C. voltage vector V which represents the instantaneous voltage as applied to the correlation comparator 14 from the quadrature network 16, and a voltage vector $v$ which represents the instantaneous voltages as applied to the correlation comparator 14 from the I.F. amplifier 12. The voltage vector V is taken as the reference voltage because its source is a stable reference oscillator. The voltage vector $v$ is able to lie in one of three positions in relation to the vector V. These positions indicate whether the received signal is modulated +60 degrees, when in position $a$, −60 degrees when in position $b$, or zero degrees when in position $c$.

When the vector $v$ is in position $c$, the output of the circuit is shown as position $f$ on the voltage time graph, shown in FIG. 2. Condition $f$ will continue for as long as the two vector voltages are in phase. As soon as vector $v$ moves to position $a$ or $b$, the voltage output will change to its lower value $g$, as shown in FIG. 2. The voltage level will remain at $g$ for as long as the vector $v$ is out of phase with the vector V, including the instantaneous change from +60 degrees phase modulation to −60 degrees phase modulation. Therefore, whenever the vector $v$ first swings to position $a$, then to $b$ without stopping, or to position $b$, then to $a$ without stopping, or through any various combinations, the output will be the same, that is, a 100 cycle per second square wave.

Again referring to FIG. 1, a phase comparator 18 has two input signals, one of which is the received 5 megacycle signal from the I.F. amplifier, and the other the inverted 5 megacycle reference signal from the stable oscillator 1. The received 5 megacycle signal is phase modulated by either +60 degrees or −60 degrees, depending upon the position information to be transmitted from the satellite. The phase comparator 18 demodulates information as a series of positive and negative voltage excursions for later application to a phase modulation decoder 20 which decodes the information contained on the demodulated signal. The operation of the phase modulation decoder 20 is not material to an understanding of the present Doppler navigation receiver. It is sufficient to note that the decoder 20 separates the encoded binary data bits which represents the position information of the satellite in accordance with the particular plan of data encoding utilized in the memory storage system carried by the orbiting satellite.

Figure 3:
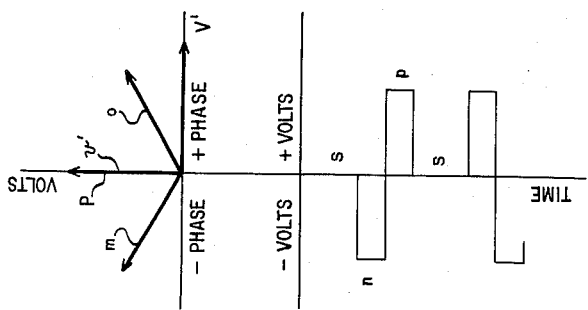
FIG. 3 is a diagram illustrating the operation of the phase comparator as used in the instant invention.

Referring to FIG. 3, the input signal derived from the stable oscillator 1, after being phase split in the quadrature network 16, is represented by a vector V′ and represents an inverted reference frequency, and the voltage vector representing the phase modulated received signal is shown as $v'$. Therefore, whenever the two applied voltages are −60 degrees out of phase with respect to each other, and $v'$ is in position $m$, a voltage is produced which attains a level as shown as $n$ in the diagram. When the vector is +60 degrees out of phase with the vector V′, as shown in position O, an output level of $p$ is obtained. When the two voltages are in phase and V′ is in position $r$, the output voltage changes to position $s$, and will stay there for as long as the voltage vectors remain in phase. It can be seen from both FIG. 2, and FIG. 3 that vectors $v$ and $v'$ are each of a lesser magnitude than vector V. For the proper operation of these circuits, this relative magnitude will be preserved by the gain control network 8.

The received signal is affected by the Doppler effect; consequently, it is always changing in frequency. However, the receiver remains locked onto the received incoming signal by a frequency locked loop which will adjust its frequency in order to maintain the output of the amplifier 12 at a constant 5 megacycles per second. The control voltage of this loop is obtained from a phase loop network 22. This network may comprise a filter network which filters the signal obtained from the phase comparator 18 and obtains a slightly varying direct-current voltage. This slightly varying voltage controls a voltage controlled crystal oscillator 24 and adjusts its rate of oscillation to track the incoming signal.

The output from the oscillator 24 is increased in a frequency multiplier 26, which generates an output frequency that is a fixed multiple of the variable frequency and is exactly 5 megacycles above the relatively high received frequency. Because this multiplied frequency is following the received frequency and separated therefrom by 5 megacycles, it includes a frequency component proportional to both the offset frequency and the Doppler frequency.

A frequency multiplier 28 increases the frequency output from the reference oscillator 1 by a factor such that its output frequency is exactly 5 megacycles above the nominal unchanged transmitted frequency ($f_h$). The output from the multiplier 28 is applied to a mixer 30. The mixer 30 has two input signals, one of which is from the multiplier 28 and consists of the nominal transmitted frequency increased by 5 megacycles, and the other is from the multiplier 26 which consists of the nominal transmitted frequency, minus the offset frequency, plus the Doppler frequency, and plus a 5 megacycle signal. The mixer 30 extracts the difference frequency which consists of the offset frequency minus the Doppler frequency. This combined difference frequency is amplified in a Doppler audio amplifier 32, and is squared up for later application to a digital section 34, for counting the number of cycles over a short increment of time. The final counts and demodulated data is printed out by a printer 36.

The digital section 34 is beyond the scope of this application, but will operate to count the output of the amplifier 32 to provide information as to the satellite altitude and to compile the binary data output of the decoder 20 into satellite geodetic coordinate information of suitable form for printing onto paper by the printer 36.

Figure 4:
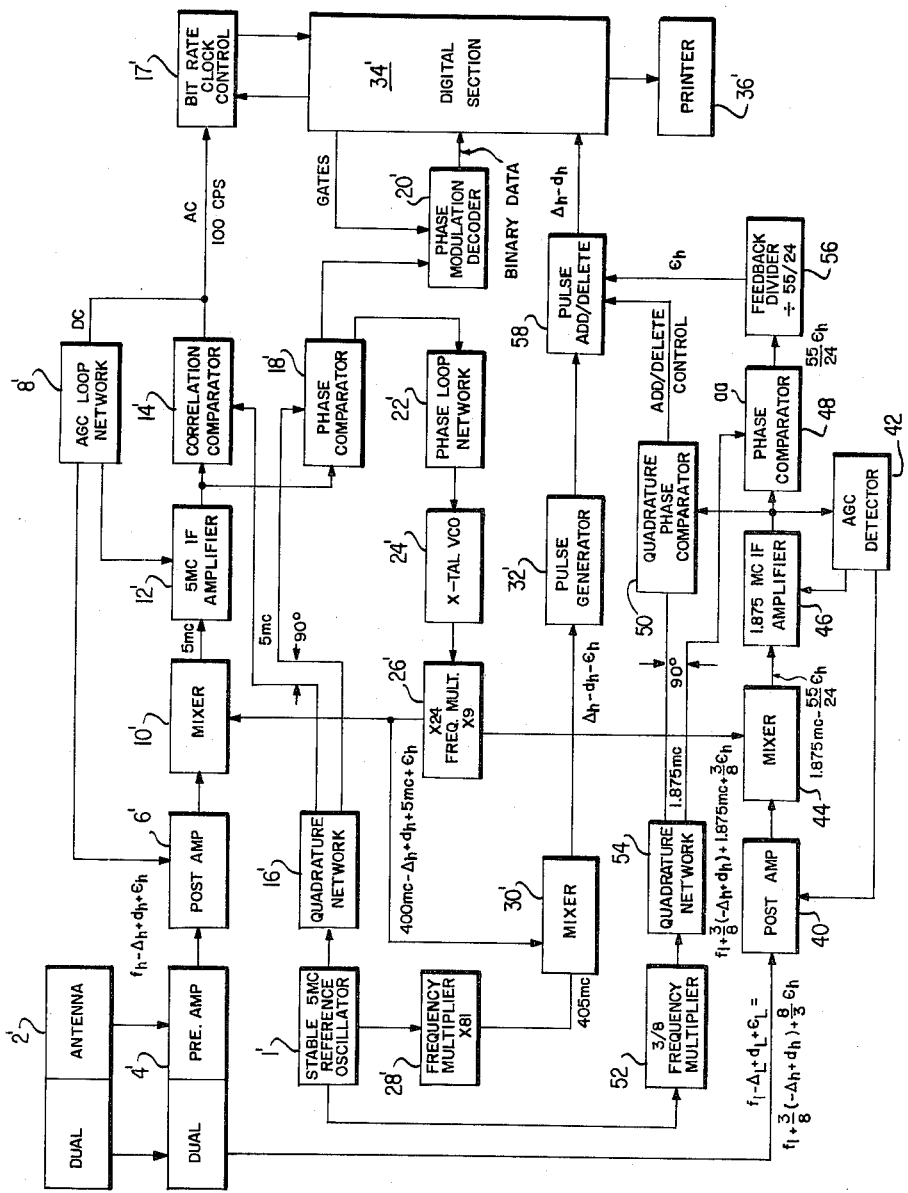
FIG. 4 is a block diagram of an embodiment of the invention in the form of a dual frequency receiver.

Referring to FIG. 4, there can be seen a modified embodiment of the instant invention, for use with two frequencies when it is necessary to have a higher degree of accuracy. During the discussion of FIG. 1, the effects of ionospheric refraction were disregarded and the error frequency term was not fully discussed. However, this term can be accounted for in a single frequency navigation receiver by pointing out that it is present throughout the processing by the receiver, and it causes a slight error in the ultimate position of the observer. For those ships who must know their position to within one tenth of a mile, it is possible to use all the original circuitry for the phase locked receiver and add only a second slaved receiver to receive a second transmitted frequency. The frequency received by the second channel is combined with the first frequency in such a way as to automatically cancel out the error frequency term attributable to the refraction effect of the ionosphere. In the following description of the modification, all those circuit previously discussed will be given the same number but with a prime.

The second frequency ($f_2$) is a relatively lower frequency than the first and can be of the magnitude of 150 megacycles per second. This is also received by a dual antenna 2' and amplified in both a dual preamplifier 4' and a post amplifier 40. The frequency applied to the post amplifier 40 is a complex frequency consisting of a satellite transmitter frequency component, minus an offset frequency component, plus a Doppler frequency component, and plus an error frequency component. However, because of the harmonic relationship between the two frequencies transmitted from the satellite, and because the refractive effect of the ionosphere has practically a linear inverse relationship to frequency, the lower received frequency can be written in terms of the higher frequency. When the lower received frequency is written thus, it can be seen that all the frequency components, other than the error term, have the same direct fractional relationship to the higher frequency as the lower transmitted frequency itself bears toward the higher transmitted frequency. The error term has the same fractional relationship but is inversely proportional to the higher error frequency term.

The post amplifier 40 has two input signals, one of which is the complex received signal from the dual preamplifier 4', and the other a control voltage from an automatic gain control detector circuit 42. The gain control circuit 42 restricts the output of the post amplifier 40 so that it will not overdrive subsequent circuitry.

A mixer 44 has two input signals, one of which is the received complex frequency from the post amplifier 40, and the other is a sub multiple of the locally generated variable frequency from the frequency multiplier 26'. The variable frequency applied to the mixer 44 is exactly 3/8 of that applied to the mixer 10'. The mixer 44 extracts a lower intermediate composite frequency consisting of a carrier frequency component minus the error frequency component. The output from the mixer 44 is applied to an intermediate frequency amplifier 46. The bandwidth of this amplifier is about 20 cycles per second, increasing the signal-to-noise ratio at the amplifier outut. The output from the amplifier 46 is applied to the gain control circuit 42, a phase comparator circuit 48, and a quadrature phase comparator circuit 50. The gain control circuit 42 uses this signal for maintaining a constant signal at the output of the amplifier 46 and for controlling the gain of the amplifiers 40 and 46.

The output of the reference oscillator 1' in the dual frequency system is applied to a frequency multiplier 52. The circuit multiplies by the ratio of the two transmitted frequencies. In this embodiment the reference frequency is multiplied by the factor of 3/8, therefore reducing the reference frequency. The output from the multiplier 52 is applied to a quadrature network 54 which produces two separate signals. Each of these two signals has the same frequency as the input signal, but is always 90 degrees out of phase with the other.

The phase comparator 50 has two input signals, one of which is a reduced inverted stable reference frequency having its source from the reference oscillator 1, and the other is the output from the amplifier 46. These two signals essentially have very close to the same frequency. The difference between the frequencies is attributable to the error frequency component introduced by the refractive effect of the ionosphere. This frequency may be either plus or minus depending on changes of the ionosphere in the satellite-to-observer propagation path, and can be best understood by referring to FIG. 5.

Figure 5:
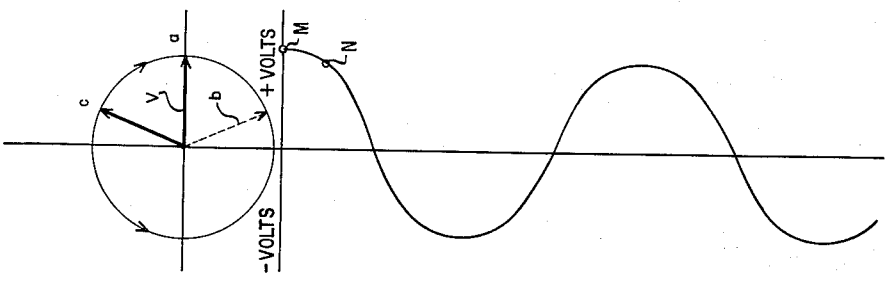
FIG. 5 is a diagram showing the operation of the quadrature phase comparator as utilized in this inveniton.

Referring to FIG. 5, the vector V represents the instantaneous voltage of the signal applied to the quadrature phase comparator 50 from the quadrature network 54. The vector $v$ represents the instantaneous voltage of the signal applied to the phase comparator 50 from the amplifier 46. The relative rotation rate between these vectors is the frequency of the error frequency component due to ionosphere refraction. As previously stated this frequency component may be either positive or negative and this condition is represented in FIG. 5 by changing the direction of rotation of the vector $v$ from clockwise to counter-clockwise. Regardless of the sense of relative rotation between the two vectors, the output voltage will always be the same. When vector $v$ is in position $a$, its output voltage is at voltage position $m$, on the output voltage graph. Whether the vector is moving clockwise to position $b$, or counter-clockwise to position $c$, its output will change to voltage $n$. This output voltage will continue as a sinusoid and its frequency will represent the error frequency component of the received signal, and it is used as an add and delete control voltage.

Referring again to FIG. 4, the phase comparator 48 has two input signals, one of which is a reduced stable reference frequency from the quadrature network 54, and the other the received signal from the amplifier 46. The relative rotation between these two frequencies is proportional to the error frequency component. The phase comparator 48 separates the error frequency from the applied frequencies. The operation of this circuit can best be understood by referring to FIG. 6, wherein the vector V' represents the instantaneous voltage applied to the phase comparator 48 from the quadrature network 54, while the vector $v'$ represents the instantaneous voltage applied to the phase comparator 48 from the amplifier 46. The relative rate of rotation between the two vectors is proportional to the error frequency term attributable to the refractive effect of the ionosphere. In this instance the direction of rotation of vector V' makes a difference in the output voltage. When vector V' moves in a clockwise direction to position $k$, indicated by an arrow made by a dotted line, its output voltage changes to position $w$ on the dotted lines of the output voltage curve. As the vector continues to rotate in this direction, its output is a sinusoid having the appearance of the curve made by a dotted line.

When the vector rotation reverses direction, the vector $V'$ will then move toward position $l$, and the output voltage will change on the solid curve of the voltage output graph to position $x$. The output voltage will change as indicated by the solid line of the voltage output graph.

Referring back to FIG. 4, the output of the phase comparator 48 is divided by a factor of 55/24, for this embodiment, in a feedback divider 56. The input of this divider 56 will be either of the sinusoids shown in FIG. 6. The divider is of normal design, shaping the input sinusoids into pulses, and will give 24 output pulses for every 55 input pulses. Although the rate of the output pulses is reduced from the rate of input, when an output pulse does occur it will coincide with an input pulse. The divider 56 equalizes the error frequency of the lower transmitted frequency with the error frequency of the higher transmitted frequency.

A pulse add and delete circuit 58 has three input signals, one of which is the add and delete control signal from the quadrature phase comparator circuit 50, the second is the equalized error frequency from the feedback divider 56, and the third is the difference frequency, in pulse form, from the pulse generator 32' which includes an error frequency component. The operation of the pulse add and delete circuit in combining all three signals to obtain a corrected frequency will be described sufficiently, with reference to FIGS. 5 and 6, to understand its application in this invention.

The output from the quadrature phase comparator 50 is shown in FIG. 5, and for purposes of understanding the operation of the pulse add and delete circuit 58, the output of the feedback divider 56 can be taken as represented by FIG. 6. The pulse add and delete circuit 58 will delete pulses from the complex difference frequency when the refraction error frequency component is positive; additionally, the add and delete circuit 58 will add pulses to this complex difference frequency when the refraction error frequency component is negative.

The pulse add and delete circuit may perform either of its two functions on the complex pulse train depending on its other two input signals. Referring to FIG. 5, a pulse will be added to the complex frequency whenever a pulse from the feedback divider 56 coincides with a positive level shown in the diagram, and a pulse from the complex frequency will be deleted whenever a pulse from the feedback divider coincides with the negative peaks shown in the diagram in FIG. 5. However, pulses from the feedback divider are available whenever either of the waveforms shown in FIG. 6 is going negative through zero. Therefore, a clockwise rotation of the vector $v'$ in FIG. 6 indicates that the error frequency term is positive and pulses must be subtracted. However, a counter-clockwise rotation of the vector $v'$ indicates that the error frequency term is negative and pulses must be added to the complex frequency term.

The instant invention will operate upon a signal received from an orbiting satellite and will perform two functions. It will, first, separate the coded position information from the transmitted signal and, second, obtain the Doppler frequency in a form that can be used to tell the observer his position.

Obviously, many modifications and variations of the present invention are possible in the light of the above teachings. It is therefore to be understood that within the scope of the appended claim the invention may be practiced otherwise than as specifically described.

We claim:

1. A navigation receiver for use in combination with an orbiting satellite emitting first and second continuous wave signals of substantially different frequencies, comprising means for receiving said continuous wave signals including varying Doppler frequency components thereof arising from the varying velocities of the satellite and the receiver, means for generating local reference signals differing in frequency from the frequencies of the received signals by amounts greater than the greatest Doppler frequency shifts in the received signals, means for comparing the received signals with the corresponding reference signals to derive the Doppler frequency components of the received signals, and means for comparing the Doppler frequency components thus derived to obtain a difference signal for correcting said derived Doppler frequencies for the effects of ionospheric refraction; said means for receiving said continuous wave signals and varying Doppler components comprising a phase locked receiving means for receiving a signal of said first frequency, and a slaved receiving means for receiving a signal of said second frequency.

2. A navigation receiver for use in combination with an orbiting satellite emitting first and second continuous wave signals of substantially different frequencies; said second frequency being relatively lower than said first; comprising a phase locked receiving means for following the frequency variations of a signal from said first radio transmitting means, a slaved receiving means for receiving a signal from said second transmitting means, means for generating a stable frequency, mixing means responsive to a signal from said phase locked receiving means and said generated frequency for obtaining their difference frequency, second mixing means responsive to signals from said slaved receiving means and said phase locked receiving means for obtaining a composite intermediate and error frequency, means for separating the error frequency from said composite frequency, means for combining said error frequency and said difference frequency to obtain a corrected frequency, and means for counting the cycles of said corrected frequency.

3. A navigation receiver as claimed in claim 2 wherein said slaved receiving means further includes phase splitting means responsive to a signal from said stable frequency generating means for obtaining said reference frequency signal and an inverted reference frequency signal, first phase comparison means responsive to said composite frequency and said inverted reference frequency for obtaining an add and delete control voltage, means for equalizing said error frequency of said lower received frequency to equal the error frequency of said higher received frequency, combining means responsive to said difference frequency, said add and delete control voltage and said equalized error frequency to obtain a corrected frequency, and means for counting the cycles of said corrected frequency.

References Cited by the Examiner

UNITED STATES PATENTS 3,123,772 3/1964 Gerks.
3,124,799 3/1964 Hagendorn et al.

OTHER REFERENCES

Proceedings of the I.R.E., vol. 48, No. 4, April 1960, pp. 750–754.

LEWIS H. MYERS, *Primary Examiner.*

CHESTER L. JUSTUS, *Examiner.*